United States Patent [19]

Miller

[11] 4,081,860

[45] Mar. 28, 1978

[54] CURRENT MODE 4-BIT ARITHMETIC LOGIC UNIT WITH PARITY

[75] Inventor: Homer Warner Miller, Peoria, Ariz.

[73] Assignee: Honeywell Information Systems Inc., Phoenix, Ariz.

[21] Appl. No.: 756,458

[22] Filed: Jan. 3, 1977

[51] Int. Cl.² .............................................. G06F 11/10
[52] U.S. Cl. ................................................... 364/738
[58] Field of Search ................................. 235/153 BB

[56] References Cited

U.S. PATENT DOCUMENTS

| | | | |
|---|---|---|---|
| 3,758,760 | 9/1973 | Cowan | 235/153 BB |
| 3,925,647 | 12/1975 | Louie | 235/153 BB |
| 3,925,651 | 12/1975 | Miller | 235/175 |
| 3,986,015 | 10/1976 | Gooding et al. | 235/153 BB |

OTHER PUBLICATIONS

Hsiao & Wolff "High–Speed, Self-Checked, BCD Adder" *IBM Tech. Disclosure Bulletin* vol. 4, No. 12 pp 59–61 May, 62.

*Primary Examiner*—David H. Malzahn
*Attorney, Agent, or Firm*—William W. Holloway, Jr.; Ronald T. Reiling; Nicholas Prasinos

[57] ABSTRACT

An arithmetic logic unit employing soft-saturating current mode logic gates receives as inputs two 4-bit plus parity bytes and generates a 4-bit plus parity binary output byte in accordance with the particular operational mode prescribed by a binary operation mode control signal. The unit performs sixteen binary arithmetic or sixteen Boolean logic operations on two 4-bit plus parity input fields Ai and Bi. A carry-in input CIN, a carry generate output G, and a carry propogate output P are provided so that the device can be utilized in a full carry look-ahead configuration with a separate carry look-ahead array. A special output $F=O$ is provided for zero detection purposes. In addition to the arithmetic and logic operations, the unit performs parity checking, parity carry, and parity prediction operations on the 4-bit plus parity binary input signals, and accordingly special inputs in the form of a carry-in duplicate CID, parity of the half-sums HS, a parity of the half-parities HP, parity of the carries PC, carry error $\overline{CE}$, and parity checking command PCK are provided. A special output E indicates a carry or half-sum parity error. A carry-out signal COUT is also provided. The device can be configured to operate on bytes having fewer than four data bits by means of a pair of configuration select signals P1 and P2.

2 Claims, 24 Drawing Figures

CURRENT MODE 4-BIT ARITHMETIC LOGIC UNIT WITH PARITY

CROSS-REFERENCE TO RELATED INVENTIONS

1. Current Mode Carry Look Ahead Array invented by Homer W. Miller, now issued as U.S. Pat. No. 3,925,652 and assigned to the same assignee as the instant invention.

2. Magnitude Comparison Circuit invented by Homer W. Miller, now issued as U.S. Pat. No. 3,955,177 and assigned to the same assignee as the instant invention.

3. Current Mode Arithmetic Logic Array invented by Homer W. Miller, now issued as U.S. Pat. No. 3,925,651 and assigned to the same assignee as the instant invention.

4. Current Mode Binary (BCD) Arithmetic Array invented by Homer W. Miller, now issued as U.S. Pat. No. 3,958,112 and assigned to the same assignee as the instant invention.

5. Data Alignment Circuit invented by Darrell L. Fett, now issued as U.S. Pat. No. 3,967,101 and assigned to the same assignee as the instant invention.

6. Selector Latch Gate invented by Darrell L. Fett, now issued as U.S. Pat. No. 3,953,746 and assigned to the same assignee as the instant invention.

7. N-Bit Register System Using CML Circuits invented by Darrell L. Fett, now issued as U.S. Pat. No. 3,984,702 and assigned to the same assignee as the instant invention.

8. High-Speed Random Access Memory invented by Darrell L. Fett, now issued as U.S. Pat. No. 3,916,394 and assigned to the same assignee as the instant invention.

9. Multiple-Generating Register invented by Darrell L. Fett, now issued as U.S. Pat. No. 3,949,209 and assigned to the same assignee as the instant invention.

10. Multiple-Generating Register invented by Jerome L. Kindell, bearing Ser. No. 642,845, now U.S. Pat. No. 4,034,198, filed Dec. 22, 1975, and assigned to the same assignee as the instant invention.

11. Current Mode Arithmetic Logic Circuit With Parity Prediction and Checking invented by Homer W. Miller bearing Ser. No. 756,457, filed Jan. 3, 1977, and assigned to the same assignee as the instant invention.

12. Current Mode 5-Bit Arithmetic Logic Unit With Parity invented by Homer W. Miller bearing Ser. No. 756,456, filed Jan. 3, 1977, and assigned to the same assignee as the instant invention.

13. Current Mode Multiple-Generating Register invented by Homer W. Miller bearing Ser. No. 756,465, filed Jan. 3, 1977, and assigned to the same assignee as the instant invention.

14. Current Mode Simultaneous Dual-Read/Single-Write Memory Device invented by Darrell L. Fett bearing Ser. No. 756,466, filed Jan. 3, 1977, and assigned to the same assignee as the instant invention.

15. Current Mode Binary/Decimal Arithmetic Logic Unit With Parity invented by Homer W. Miller bearing Ser. No. 756,460, filed Jan. 3, 1977, and assigned to the same assignee as the instant invention.

16. 5-Bit 1-of-4 Gated Select Circuit Utilizing Current Mode Logic invented by Homer W. Miller bearing Ser. No. 756,464, filed Jan. 3, 1977, and assigned to the same assignee as the instant invention.

17. 17-Bit Equality Comparator Utilizing Current Mode Logic invented by Homer W. Miller bearing Ser. No. 756,459, filed Jan. 3, 1977, and assigned to the same assignee as the instant invention.

18. J-K Flip-Flop Utilizing Current Mode Logic With Non-Functional Test Capability invented by Homer W. Miller bearing Ser. No. 756,461, filed Jan. 3, 1977, and assigned to the same assignee as the instant invention.

19. 4-Bit Counter/Shift Register Utilizing Current Mode Logic invented by Homer W. Miller bearing Ser. No. 756,463, filed Jan. 3, 1977, and assigned to the same assignee as the instant invention.

20. 10-Bit D-Type Register Utilizing Current Mode Logic invented by Homer W. Miller bearing Ser. No. 756,462, filed Jan. 3, 1977, and assigned to the same assignee as the instant invention.

BACKGROUND OF THE INVENTION

This invention relates generally to digital logic circuitry and, more particularly, to an improved current mode 4-bit arithmetic logic unit with parity.

Various arithmetic logic units are known in the prior art. The current mode arithmetic logic array disclosed in Related Invention No. 3 is directed to an arithmetic logic array which performs the basic arithmetic and logic functions of the present invention. The improved current mode 4-bit arithmetic logic unit with parity of the present invention provides, in addition to the basic arithmetic and logic functions, necessary and useful parity predicting, parity checking, and carry error detection on a 4-bit plus parity binary field. Consequently, errors generated within the arithmetic logic unit or errors which are generated during the transmission of such binary data to the arithmetic logic unit are detected quite early in the processing operation, resulting in an overall savings of processing time.

OBJECTS OF THE INVENTION

It is therefore an object of the present invention to provide an improved current mode 4-bit arithmetic logic unit with parity.

It is also an object of the present invention to provide an improved current mode 4-bit arithmetic logic unit with parity which performs parity prediction operations on a 4-bit binary field.

It is yet another object of the present invention to provide an improved current mode 4-bit arithmetic logic unit with parity which performs parity checking operations on a 4-bit binary field.

These and other objects of the invention are achieved in accordance with a preferred embodiment of the invention by providing an improved current mode 4-bit arithmetic logic unit with parity comprising a logic portion including a half-adder and circuitry performing other logic functions on two 4-bit plus parity sets of data inputs $Ai$ and $Bi$, a carry look-ahead circuit portion, and a half-sum and carry portion. In addition to the two 4-bit plus parity sets of inputs, a 5-bit mode control signal is received as an input for determining the particular arithmetic or logic function to be performed on the input data. A carry input CIN is also provided. A pair of configuration select signals P1 and P2 is provided for enabling the device to be operative on data fields of less than four data bits. In order to perform the parity prediction, parity checking, and carry checking operations, a carry-in duplicate signal CID, parity of the half-sums signal HS, parity of the half-parities signal HP, parity of the carry signal PC, carry error signal $\overline{CE}$, and half-sum check signal PCK input are provided.

The unit generates a 4-bit plus parity output Fi and a carry-out signal COUT. In addition, a carry-in input signal CIN and propogate P and generate G output signals are provided for utilization when the device is connected to a carry look-ahead array of the type described in Related Invention No. 1. Furthermore, an output error signal E is generated when either a carry error or a half-sum parity error is detected.

Importantly, each portion of the arithmetic logic unit is implemented using soft-saturating current mode logic gates as basic circuit elements.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIGS. 5a-13a show various logic symbols appearing in FIGS. 2A, 2B, 3A, 3B, and 14.

FIGS. 5b-13b show detailed circuit schematics for performing the logic functions represented by the logic symbols in FIGS. 5a-13a.

DETAILED DESCRIPTION OF THE INVENTION

Figure 1:
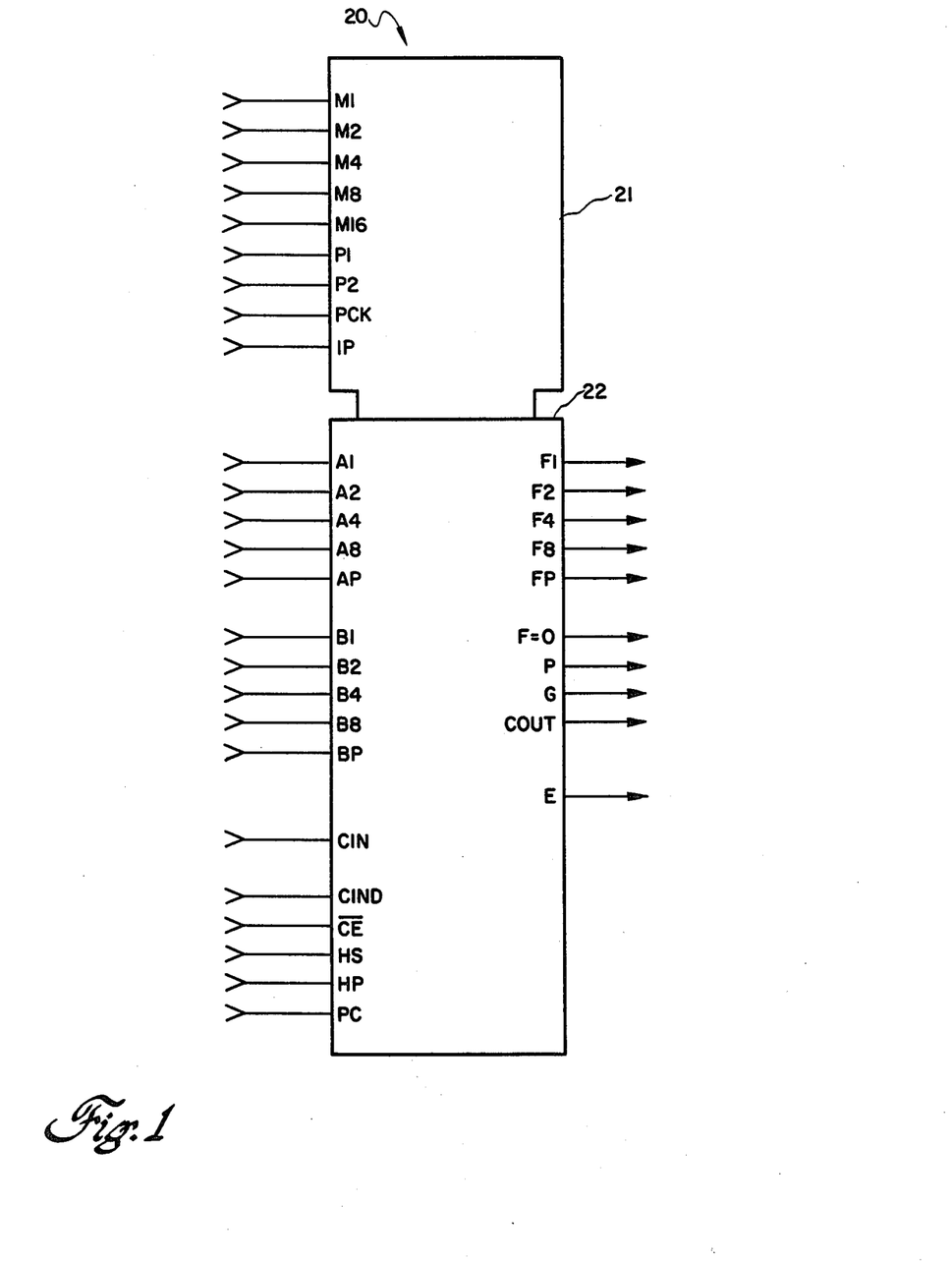
FIG. 1 shows a symbolic representation of the current mode 4-bit arithmetic logic unit with parity, including the inputs thereto and outputs therefrom, of the present invention.

Referring now to the drawings, and in particular to FIG. 1, a symbolic representation of the current mode 4-bi arithmetic logic unit with parity is shown, including the inputs thereto and the outputs therefrom. The 4-bit arithmetic logic unit 20 comprises a control portion 21 and an input/output portion 22. Control portion 21 receives a 5-bit mode control signal M1-M16 for prescribing the particular arithmetic or logic operation to be performed. Two configuration select signals P1 and P2 determine the configuration of the device so tht it may operate on fewer than four data input bits if desired. A parity check control signal PCK is used to enable a half-sum parity check and is normally in the true state unless the input data does not contain parity bits and only parity prediction is desired. An invert parity signal IP is used to enable an operation whereby the binary output parity bit FP is inverted for the purpose of testing downstream parity checking circuits when the device of the present invention is utilized in conjunction with additional logic circuitry.

The input/output portion 22 receives as inputs two 4-bit plus parity input fields A1-A8 and Ap and B1-B8 and BP. In addition, the input/output portion 22 receives a carry-in input signal CIN and a carry-in duplicate signal CIND. Further input signals to the device take the form of a carry error signal $\overline{CE}$ parity of the half-sum signal HS, parity of the half parities signal HP, and parity of the carries signal PC. The input/output portion 22 generates a binary output F1-F8 plus parity bit FP in accordance with the particular arithmetic or logic function prescribed by the mode control signal M1-M16. In addition, portion 22 provides a zero-valued output signal $F = 0$ for zero detection purposes. Furthermore, portion 22 produces a propagate signal P, a generate signal G, and a carry-out signal COUT which are utilized when the device is used in combination with other arrays and in particular when the carry look-ahead array disclosed in Related Invention No. 1 is used. Finally, an output error signal E is generated when either a carry error or a half-sum parity error is detected by the internal circuitry of the device.

As stated above, the current mode 4-bit arithmetic logic unit with parity employs soft-saturating current mode logic gates including several basic circuit components, which individual circuit components are illustrated in FIGS. 5-13. In these figures, the logic symbol is illustrated together with a detailed schematic of the individual electrical circuit. The overall logic architecture includes a lower level gate and an upper level gate, which in combination have an output voltage swing of only approximately 0.5 V. This limited voltage swing reduces the power requirements and reduces the transition time.

Figure 5A:
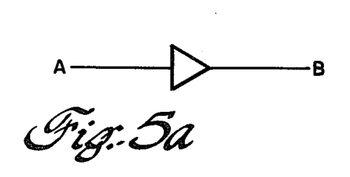
Figure 5B:
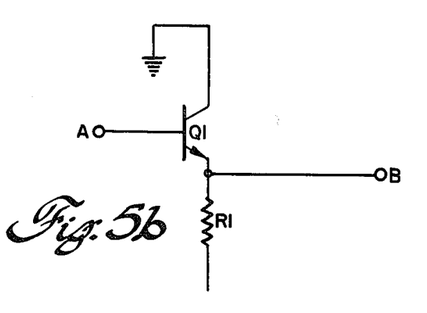

FIG. 5a is the symbol for an emitter follower having an input A and an output B. This is used in the present invention primarily as a voltage translator, shifting the voltage applied at input A down by 0.8V at the output B. FIG. 5b shows the equivalent electrical circuit, wherein input A is applied to the base of transistor Q1, and output B is taken at the common terminal of resistor R1 and the emitter of transistor Q1.

Figure 6A:
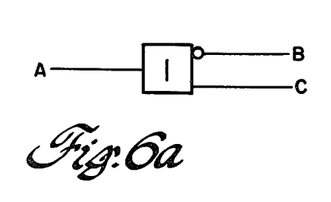
Figure 6B:
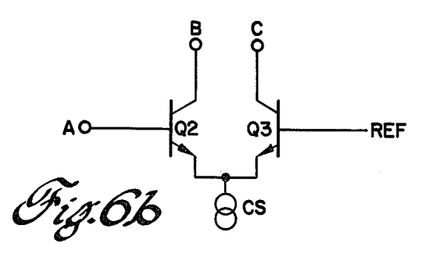
Figure 7A:
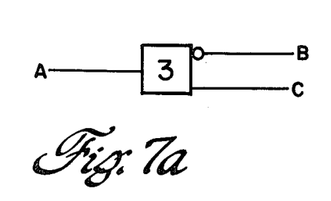
Figure 7B:
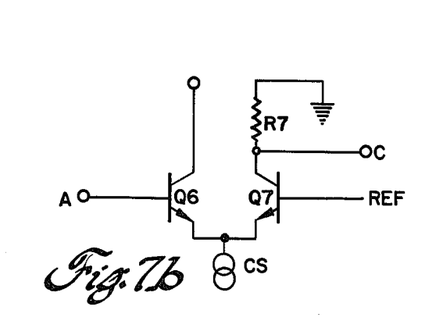

FIGS. 6a and 7a illustrate the symbol for a lower level gate, which gate may be implemented either of the two ways illustrated in FIGS. 6b and 7b depending upon whether the outputs of the lower level gate drive an upper level gate or not. The lower level gate has an input A, a true output C and a complement output B. In FIG. 6b and A input is applied to the base of transistor Q2, and a reference voltage of −1.06 V is applied to the base of transistor Q3. The true or C output is taken from the collector terminal of transistor Q3, and the complement or B output is taken from the collector of transistor Q2. With NPN bipolar transistors a binary 0 at input A in the form of 0.8V signal causes conduction in transistor Q2 and non-conduction in transistor Q3, so that a binary 0, representing the absence of current is generated over the C output, and a binary 1, representing the presence of current, appears at the B output. Conversely, a binary 1 at input A renders transistor Q2 non-conductive and transistor Q3 conductive, thereby generating a binary 0 at output B and a binary 1 at output C. When either or both of the outputs B and C of the lower level gate are used to drive an upper level gate, such as that illustrated in FIGS. 9, 10, and 12, the resistor is eliminated from the corresponding leg of the output portion of the lower level gate. Thus regarding the circuit shown in FIG. 7b, the B output drives an upper level gate, whereas the C output does not drive an upper level gate.

Figure 8A:
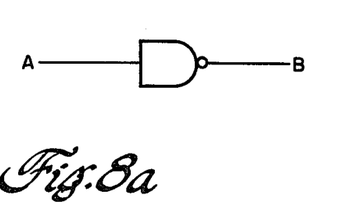
Figure 8B:
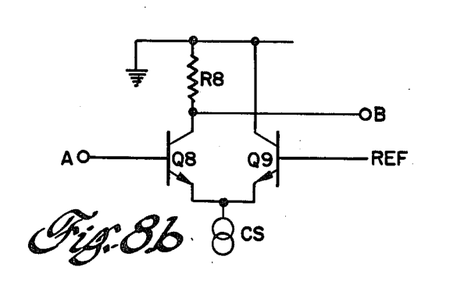

FIG. 8a shows the logic symbol for an inverter having an input A and an inverting output B. Referring to FIG. 8b, when a binary 1 in the form of a 0.5 V signal (assuring a negative logic convention) appears on input A at the base of transistor Q8, Q8 is turned off, and a 0 V signal representing a binary 0 appears at the output B. Conversely, when input A is a binary 0, Q8 turns on, and the voltage at output B is −0.5 V representing a binary 1.

Figure 9A:
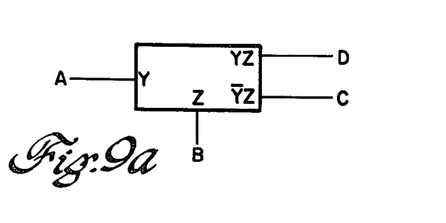

FIG. 9a shows the symbol for a 2-input upper level gate having inputs A and B applied to input terminals Y and Z, respectively, and producing Y·Z and $\overline{Y}$·Z outputs at output terminals D and C, respectively. In the equivalent electrical schematic of FIG. 9b input A is applied to the base of transistor Q10, and input B is applied to the common terminal of the emitters of transistors Q10 and Q11, A reference voltage of −0.26 V is applied to the base of transistor Q11, and the collectors of transistors Q10 and Q11 are connected through resistors R10 and R11, respectively, to ground. The C output is taken at the collector of transistor Q10, and the D output is taken at the collector of transistor Q11.

Figure 10A:
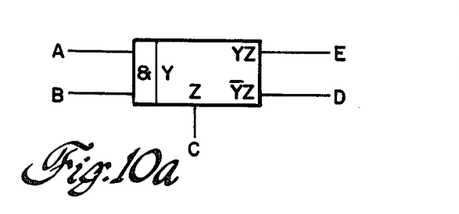

The upper level gate shown in FIG. 10a is similar in function to that shown in FIG. 9a, the Y input here being the AND function of inputs A and B and the input again being the C input. Thus, output E equals A·B·C and output D equals $\overline{A·B}$·C. With reference to the equivalent electrical schematic shown in FIG. 10b, and A and B inputs are applied to the bases of transistors Q13 and Q12, respectively, the C input is applied to the common terminal of the emitters of transistors Q12–Q14, the D output is taken at the common terminal of the collectors of transistors Q12 and Q13, and the E output is taken at the collector of transistor Q14. For current to flow through the E output, inputs A and B must both be a binary 1 in the form of a −0.5 V signal, thus rendering transistor Q14 conductive and input C must be present. Otherwise, if either of the A or B inputs are a binary 0 (OV) and the C input is present, current will flow through output terminal D.

Figure 9B:
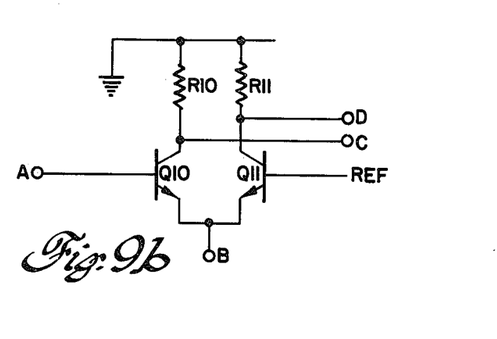
Figure 10B:
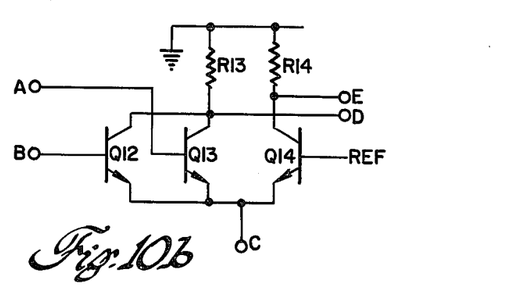

The upper level gates of FIGS. 9 and 10 are used in combination with the lower level gates shown in FIGS. 6 and 7. As described previously, the reference voltage for the upper level gates is −0.26 V and the logic inputs are either 0 V or −0.5 V. Voltage swings between 0 and −0.5 V. Since the inputs to the lower level gates are derived from emitter followers, the consequent 0.8 V voltage translation necessitates a reference voltage of −1.06 V for the lower level gates.

Figure 11A:
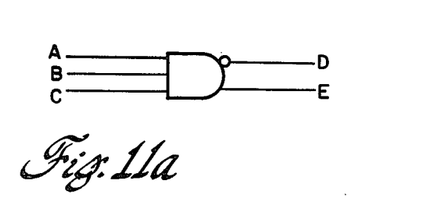
Figure 11B:
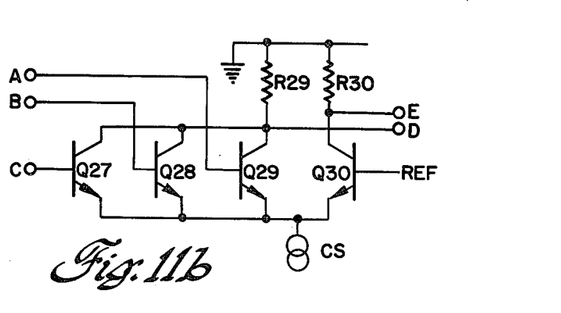

FIG. 11a shows the logic symbol for a three input NAND gate having a true output E and a complementary output D. The true output E of the NAND gate is a logical 1 whenever any of the inputs is a logical 0, and the true output E becomes a logical 0 only when all three inputs are logical 1's. The equivalent electrical circuit is shown in FIG. 11b wherein the collector outputs of transistors Q27–Q30 are all tied to current source CS, the collector junctions of transistors Q27–Q29 are connected to ground through resistors R29, and the collector junction of transistor Q30 is connected to ground through resistor R30. The C, B and A inputs are connected to the bases of transistors Q27, Q28 and Q29, respectively. The D output is tied to the common junction of the collector of transistor Q29 and resistor R29. The E output is connected to the common junction of the collector of transistor Q30 and resistor R30.

Figure 12A:
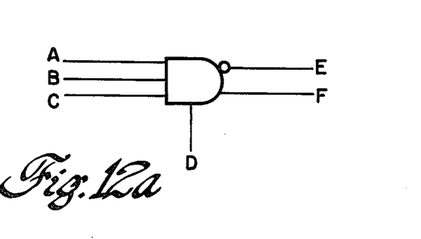
Figure 12B:
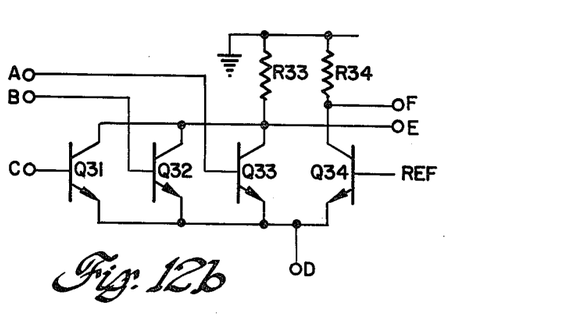

FIG. 12a illustrates the logic symbol for a upper-level gate having inputs A and B of opposite polarity and an enabling input C. Output D is of the same polarity as input A, and output E has the polarity of input B. Referring to the equivalent schematic of FIG. 12b, input A supplied to the base of transistor Q17, input B is applied to the base of transistor Q18, input C is applied to the common terminal of the emitters of transistors Q17 and Q18, output D is taken from the junction of resistor R18 and the collector of transistor Q18, and output E is taken from the junction of resistor R17 and the collector of transistor Q17.

Figure 13A:
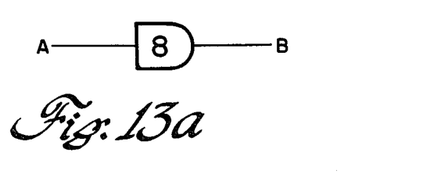
Figure 13B:
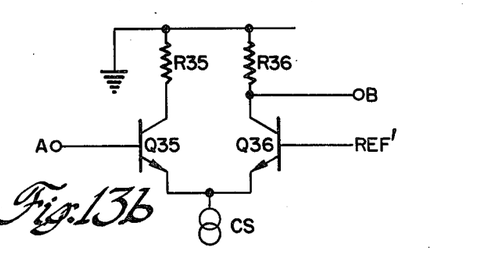

FIG. 13a illustrates the symbol for a voltage translator circuit. FIG. 13b illustrates the equivalent electrical circuit, wherein input A is applied to the base of transistor Q31, and output B is taken at the common terminal of resistor R32 and the collector of transistor Q32. The reference voltage REF' applied to the base of transistor Q32 differs from the normal reference voltage REF.

With these basic functional circuit elements in mind, defined by the logic symbols illustrated in FIGS. 5a–13a and the equivalent electrical schematics illustrated in FIGS. 5b–13b, we will now consider the overall architecture of the current mode 4-bit arithmetic logic unit with parity of the present invention as illustrated in FIGS. 2A, 2B, 3A, 3B, and 14.

Figure 2A:
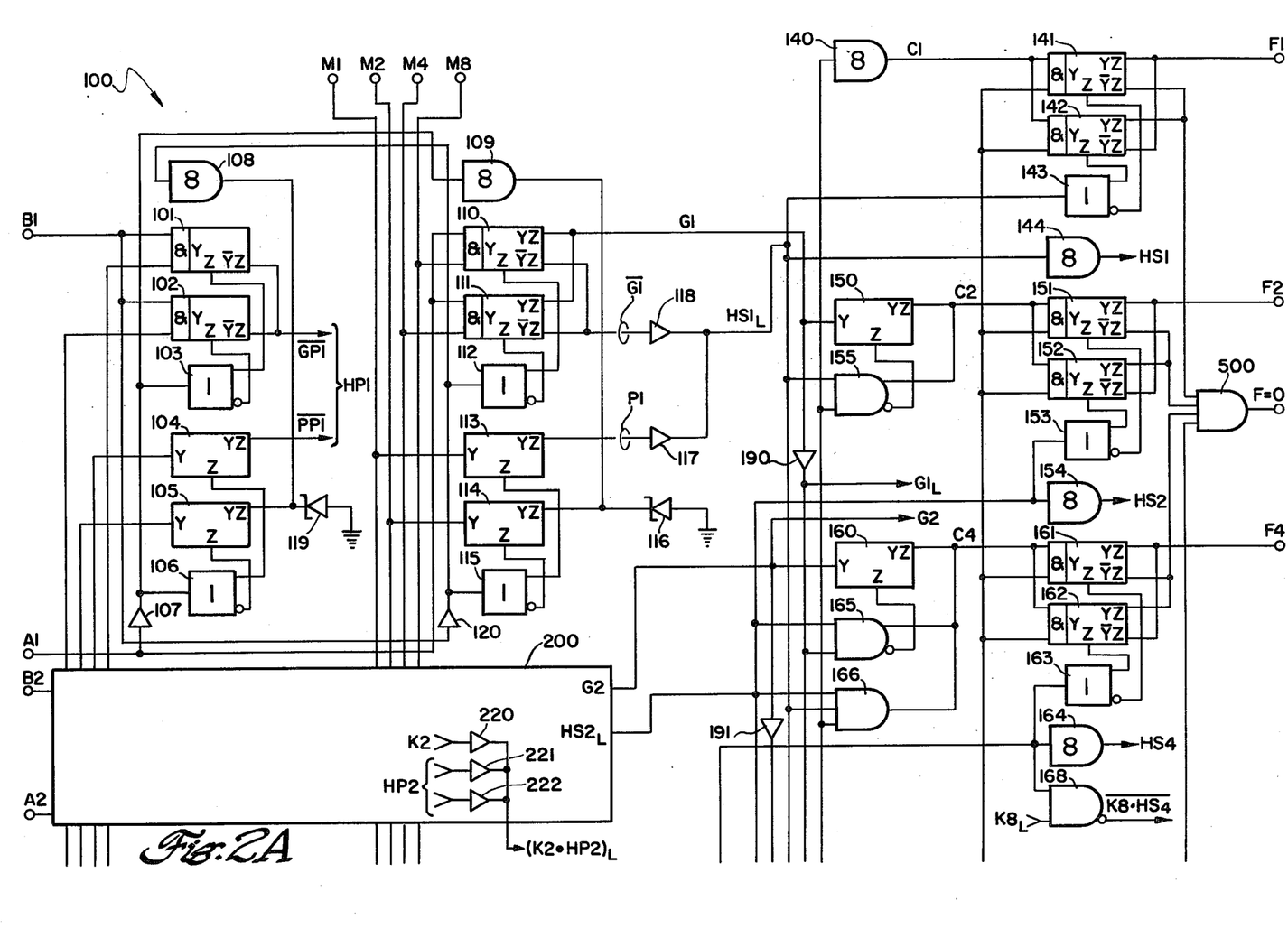
FIGS. 2A and 2B show a combination block/circuit diagram illustrating a portion of a preferred embodiment of the current mode 4-bit arithmetic logic unit with parity of the present invention.
Figure 2B:
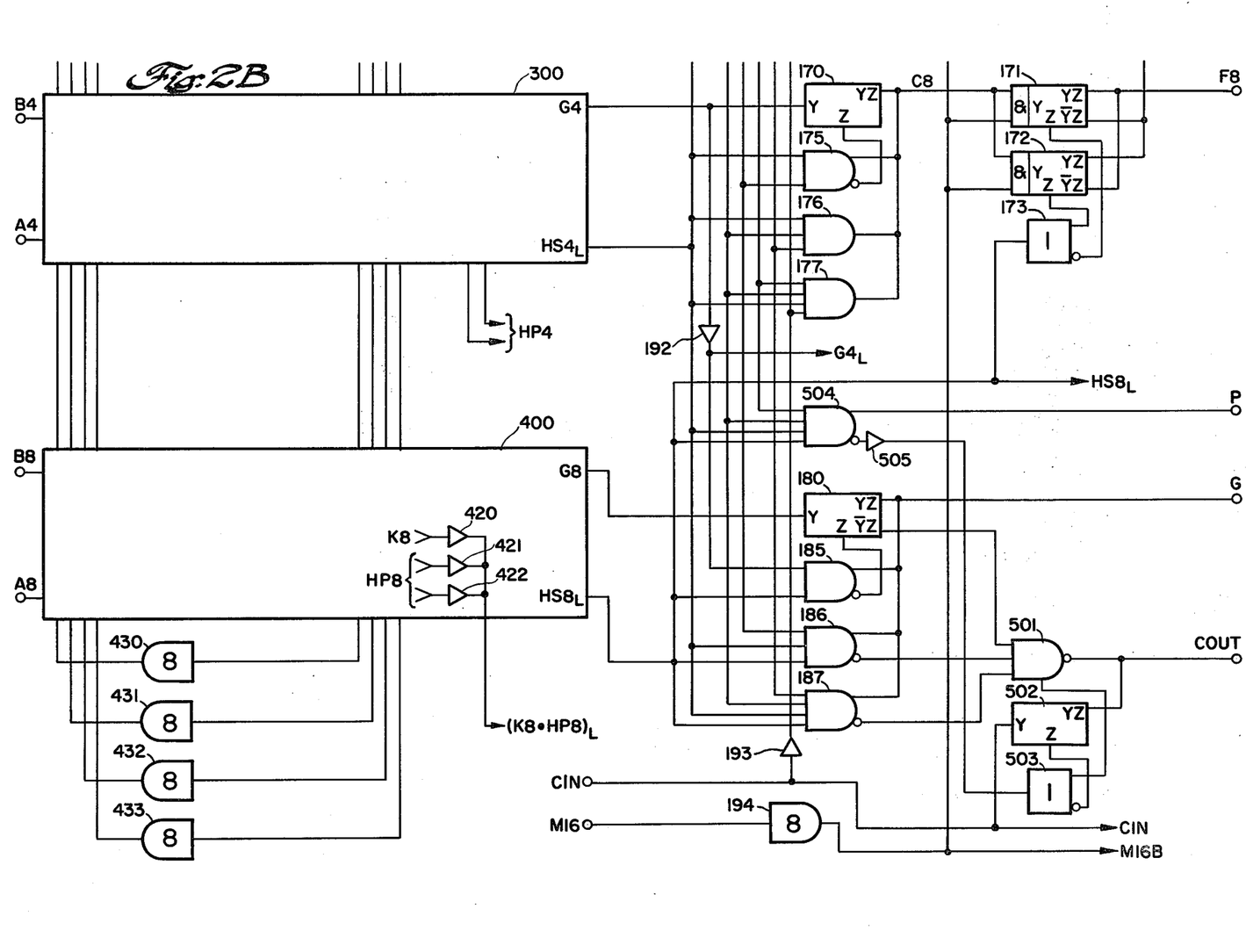

FIGS. 2A and 2B show a combination block-circuit diagram illustrating that portion of a preferred embodiment of the present invention which generates the binary output signal F1–F8, the F=0 output signal, the propogate signal P and generate signal G, and the carry-out output signal COUT. The detailed circuitry illustrated in FIGS. 2A and 2B also serves to generate a number of intermediate-level signals, which are used as inputs to the circuitry shown in FIGS. 3A and 3B.

Figure 3A:
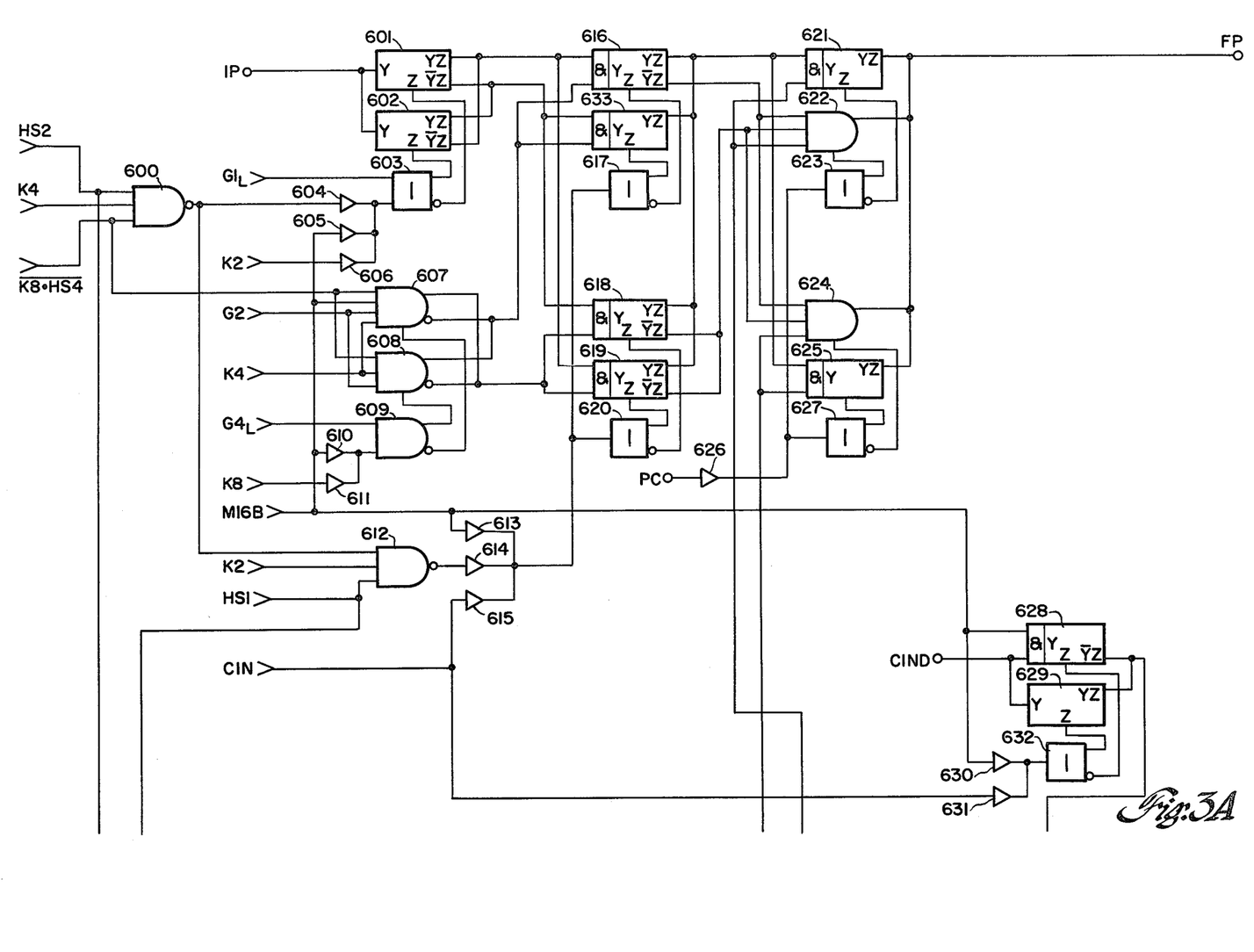
FIGS. 3A and 3B show a combination block/circuit diagram illustrating another portion of a preferred embodiment of the current mode 4-bit arithmetic logic unit with parity of the present invention.
Figures 3B, 14:
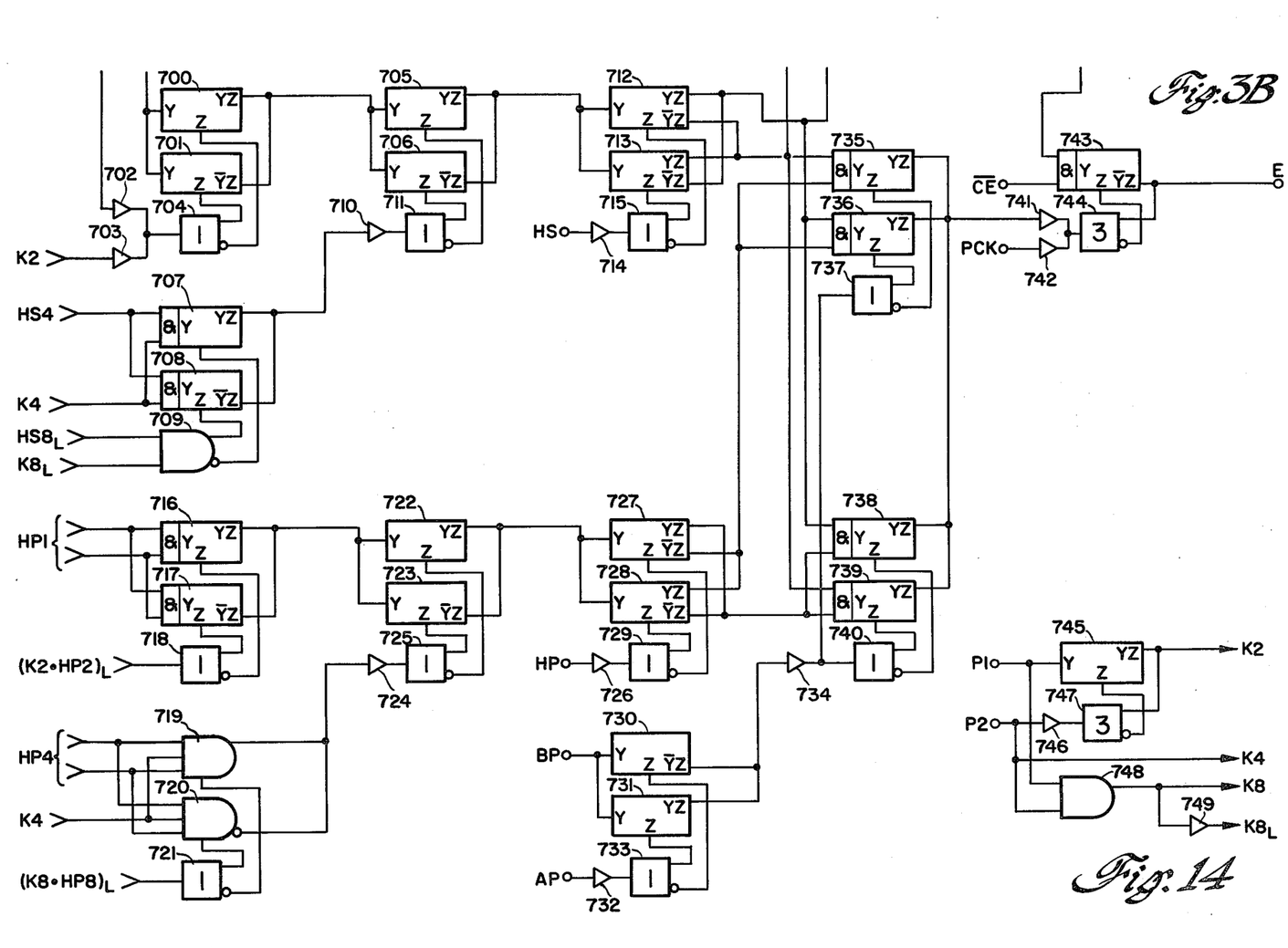
FIG. 14 shows a block diagram illustrating a further portion of a preferred embodiment of the current mode 4-bit arithmetic logic unit with parity of the present invention.

FIGS. 3A and 3B show a combination block/circuit diagram illustrating another portion of the preferred embodiment of the present invention, which circuitry serves to generate the binary output parity bit FP and the error signal E. The circuitry shown in FIGS. 3A and 3B also receives an inputs the parity bits AP and BP from the A$i$ and B$i$ input fields, respectively.

With reference now specifically to FIGS. 2A and 2B, it will be seen that the A1 and B1 input bits are transmitted into that portion indicated generally by reference numeral 100. Correspondingly, bits A2 and B2 are transmitted into circuit portion 200. Bits A4 and B4 are transmitted into circuit portion 300. And bits A8 and B8 are transmitted into circuit portion 400. Circuit portions 100–400 all receive as additional inputs mode control signals M1–M8 shown in the upper-most portion of FIG. 2A. The carry-in signal CIN and mode control signal M16 are received at the terminals shown in the lower-most portion of FIG. 2B.

The interconnected circuit elements shown in FIGS. 2A and 2B operate on the above-mentioned input signals to generate the various intermediate-level signals in the form of the half-sum HS$i$, half-parity HP$i$, carry propogate P$i$, parity propogate PP$i$, carry generate G$i$, and parity generate CP$i$ signals in accordance with the following logic equations and state table:

| Half Sum, Half Parity, Propagates, and Generates Intermediate Signals (HSi, HPi, Pi, PPi, Gi, GPi) | | | | | |
|---|---|---|---|---|---|
| for i = 1,2,4,8 | | | | | |
| $Gi = M8 \cdot Ai \cdot Bi + M4 \cdot Ai \cdot \overline{Bi}$ | | | $GPi = M8 \cdot Bi \cdot Ai + M1 \cdot Bi \cdot \overline{Ai}$ | | |
| $Pi = Ai + M2 \cdot \overline{Bi} + M1 \cdot Bi$ | | | $PPi = Bi + M2 \cdot \overline{Ai} + M4 \cdot Ai$ | | |
| $HSi = \overline{Gi} \cdot Pi$ | | | $HPi = \overline{GPi} \cdot PPi$ | | |
| M8 | M4 | M2 | M1 | HSi | HPi |
| 0 | 0 | 0 | 0 | Ai | Bi |
| 0 | 0 | 0 | 1 | $Ai + Bi$ | $Ai \cdot Bi$ |
| 0 | 0 | 1 | 0 | $Ai + \overline{Bi}$ | $\overline{Ai} = Bi$ |
| 0 | 0 | 1 | 1 | 1 | $Ai \oplus Bi$ |
| 0 | 1 | 0 | 0 | $Ai \cdot Bi$ | $Ai + Bi$ |
| 0 | 1 | 0 | 1 | Bi | Ai |
| 0 | 1 | 1 | 0 | $Ai \oplus Bi$ | 1 |
| 0 | 1 | 1 | 1 | $\overline{Ai} + Bi$ | $Ai + \overline{Bi}$ |
| 1 | 0 | 0 | 0 | $Ai \cdot \overline{Bi}$ | $\overline{Ai} \cdot Bi$ |
| 1 | 0 | 0 | 1 | $Ai \oplus Bi$ | 0 |
| 1 | 0 | 1 | 0 | $\overline{Bi}$ | $\overline{Ai}$ |
| 1 | 0 | 1 | 1 | $Ai + \overline{Bi}$ | $\overline{Ai} \cdot \overline{Bi}$ |
| 1 | 1 | 0 | 0 | 0 | $Ai \oplus Bi$ |
| 1 | 1 | 0 | 1 | $\overline{Ai} \cdot Bi$ | $Ai \cdot \overline{Bi}$ |
| 1 | 1 | 1 | 0 | $\overline{Ai} \cdot Bi$ | $\overline{Ai} + \overline{Bi}$ |
| 1 | 1 | 1 | 1 | $\overline{Ai}$ | $\overline{Bi}$ |

The carry intermediate signals Ci are generated in accordance with the following logic equations:

| Carry Intermediate Signals (Ci) | | | |
|---|---|---|---|
| C1 = | | | CIN |
| C2 = | | G1 + | HS1·CIN |
| C4 = | G2 + | HS2·G1 + | HS2·HS1·CIN |
| C8 = | G4 + HS4·G2 + | HS4·HS2·G1 + | HS4·HS2·HS1·CIN |

The function output signals Fi are generated in accordance with the following logic equation:

FUNCTION OUTPUT SIGNALS (Fi)

for $i = 1,2,4,8$ $Fi = HSi \oplus (Ci \cdot M16)$

The special outputs in the form of the F=0, carry-out COUT, generate G, and propagate P signals are generated in accordance with the following logic equations:

SPECIAL OUTPUTS $(F = 0) = \overline{F8} \cdot \overline{F4} \cdot \overline{F2} \cdot \overline{F1}$ $COUT = G8 + HS8 \cdot G4 + HS8 \cdot HS4 \cdot G2 + HS8 \cdot HS4 \cdot HS2 \cdot G1 + HS8 \cdot HS4 \cdot HS2 \cdot HS1 \cdot CIN$ $G = G8 + HS8 \cdot G4 + HS8 \cdot HS4 \cdot G2 + HS8 \cdot HS4 \cdot HS2 \cdot G1$ $P = HS8 \cdot HS4 \cdot HS2 \cdot HS1$ The resultant arithmetic and logic operations for the current mode 4-bit arithmetic logic unit with parity described above are given by the equations in the following table as a function of the 5-bit mode control signal M1–M16:

| M8 | M4 | M2 | M1 | M16 = 0 | M16 = 1 |
|---|---|---|---|---|---|
| 0 | 0 | 0 | 0 | F = A | F = A plus CIN |
| 0 | 0 | 0 | 1 | F = A + B | F = A + B plus CIN |
| 0 | 0 | 1 | 0 | $F = A + \overline{B}$ | $F = A + \overline{B}$ plus CIN |
| 0 | 0 | 1 | 1 | F = logical 1 | F = minus 1 plus CIN |
| 0 | 1 | 0 | 0 | F = A · B | F = A plus (A·$\overline{B}$) plus CIN |
| 0 | 1 | 0 | 1 | F = B | F = (A+B) plus (A·$\overline{B}$) plus CIN |
| 0 | 1 | 1 | 0 | $F = A \oplus B$ | F = A minus B minus 1 plus CIN |
| 0 | 1 | 1 | 1 | $F = \overline{A} + B$ | F = (A·$\overline{B}$) minus 1 plus CIN |
| 1 | 0 | 0 | 0 | $F = A \cdot \overline{B}$ | F = A plus (A·B) plus CIN |
| 1 | 0 | 0 | 1 | $F = A \oplus B$ | F = A plus B plus CIN |
| 1 | 0 | 1 | 0 | $F = \overline{B}$ | F = (A+$\overline{B}$) plus (A·B) plus CIN |
| 1 | 0 | 1 | 1 | $F = \overline{A} + \overline{B}$ | F = (A·B) minus 1 plus CIN |
| 1 | 1 | 0 | 0 | F = logical 0 | F = A plus A plus CIN |
| 1 | 1 | 0 | 1 | $F = \overline{A} \cdot B$ | F = (A+B) plus A plus CIN |
| 1 | 1 | 1 | 0 | $F = \overline{A} \cdot \overline{B}$ | F = (A+$\overline{B}$) plus A plus CIN |
| 1 | 1 | 1 | 1 | $F = \overline{A}$ | F = A minus 1 plus CIN |

With reference now in particular to FIGS. 3A and 3B, it will be seen that such circuitry receives as inputs the various intermediate-level signals generate by the circuitry shown and described above with regard to FIGS. 2A and 2B. In addition, the circuitry in FIGS. 3A and 3B receives as inputs the invert parity input IP, which is applied to the Y input of upper level gate 601, the parity check input PCK which is applied to emitter follower 742, the carry-in duplicate signal CIND which is applied as an input to upper level gate 628, the parity bits AP and BP associated with the Ai and Bi input fields, respectively, and which are transmitted to emitter follower 732 and to upper level gates 730 and 731, respectively, the carry error signal $\overline{CE}$ which is transmitted as an input to upper level gate 743, the parity of the half-sum signal HS which is transmitted to emitter follower 714, the parity of the half-parities signal HP which is transmitted to emitter follower 726, and the parity of the carry signal PC which is transmitted to emitter follower 626. The circuitry shown in FIGS. 3A and 3B generates the binary output predicted parity bit FP and the output error signal E in the event of a carry or half-sum parity error.

The interconnected circuit elements shown in FIGS. 3A and 3B operate on the designated intermediate-level inputs and on the aforementioned primary inputs to generate the binary output predicted parity bit FP and the error output E in accordance with the following logic equations:

PARITY (FP) AND ERROR (E) OUTPUTS $FP = \{CIN \cdot [(\overline{HS1 \cdot K2}) + (HS2 \cdot K4 \cdot (\overline{HS4 \cdot K8}))] \cdot M16\}$ $\oplus \{G1 \cdot K2 \cdot [(\overline{HS2 \cdot K4}) + (HS4 \cdot K8)] \cdot M16\}$ $\oplus \{G2 \cdot K4 \cdot (\overline{HS4 \cdot K8}) \cdot M16\}$ $\oplus \{G4 \cdot K8 \cdot H16\}$ $\oplus \{IP\}$ $\oplus \{PC\}$ $+ \{\overline{HS \oplus HS1 \oplus (HS2 \cdot K2) \oplus (HS4 \cdot K4) \oplus (HS8 \cdot K8)}\}$ $E = \{(CIN \oplus \overline{CIN}) \cdot M16\} + \{\overline{CE}\} + \{[\overline{AP \oplus BP}]$ $\oplus [\overline{HS \oplus HS1 \oplus (HS2 \cdot K2) \oplus (HS4 \cdot K4) \oplus (HS8 \cdot K8)}]$ $\oplus [HP \oplus HP1 \oplus (HP2 \cdot K2) \oplus (HP4 \cdot K4) \oplus (HP8 \cdot K8)] \cdot PCK$ $K2 = P2 + P1$ $K4 = P2$ $K8 = P2 \cdot P1$ FIG. 14 shows a block diagram illustrating that portion of the detailed circuitry of the present invention which determines the particular configuration of the devices as to whether it is to operate on 4, 3, 2, or 1 bits of data. The circuitry of FIG. 14 receives as inputs the configuration select signals P1 and P2, and it generates intermediate output signals K2, K4, K8, and $K8_L$, which intermediate-level output signals are utilized by the circuitry shown in FIGS. 3A and 3B to configure the device according to the number of active bits n in accordance with the following table:

| P2 | P1 | K8 | K4 | K2 | # of Active Bits n in ALU |
|----|----|----|----|----|---------------------------|
| 0  | 0  | 0  | 0  | 0  | 1 |
| 0  | 1  | 0  | 0  | 1  | 2 |
| 1  | 0  | 0  | 1  | 1  | 3 |
| 1  | 1  | 1  | 1  | 1  | 4 |

Figure 4:
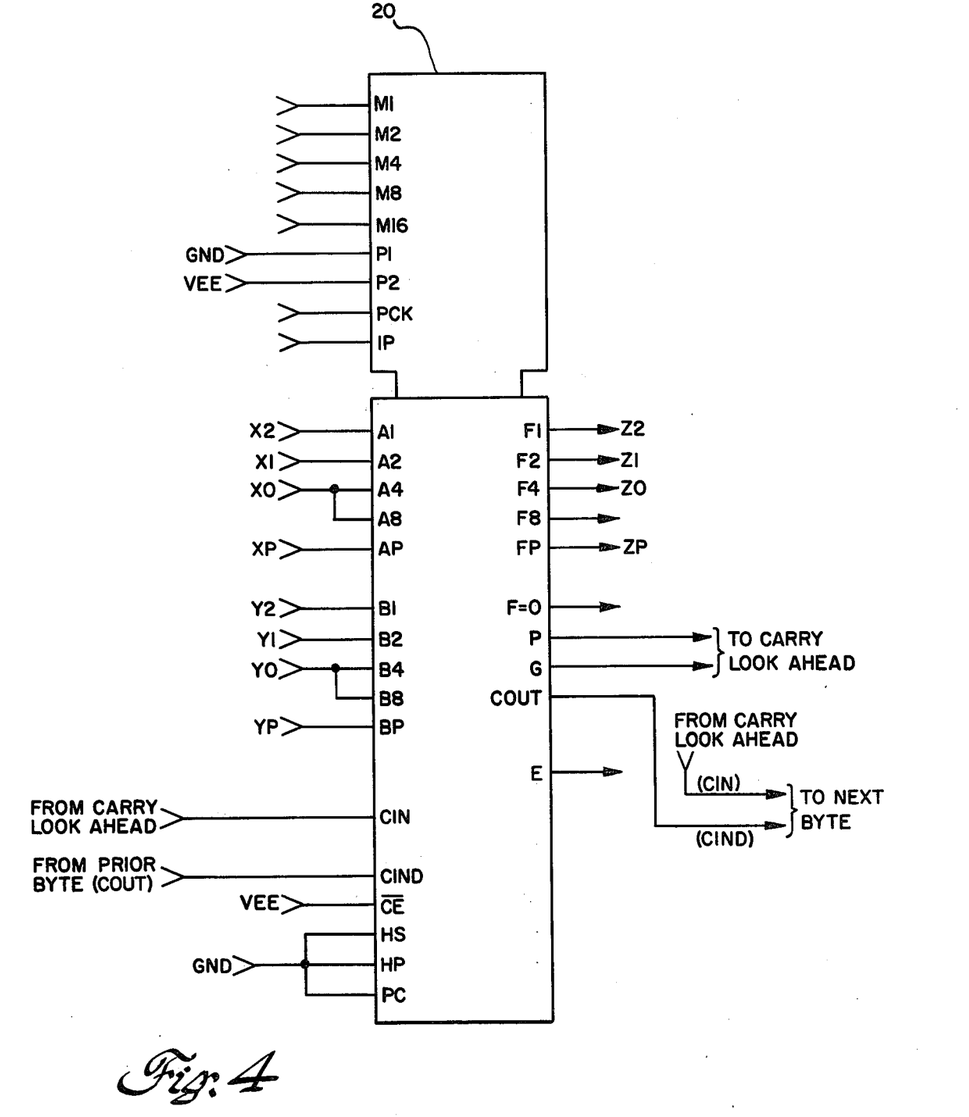
FIG. 4 represents a typical use configuration for the current mode 4-bit arithmetic logic unit with parity of the present invention.

FIG. 4 illustrates a block diagram representing a typical use configuration for the current mode 4-bit arithmetic logic unit with parity. As shown in FIG. 4, device 20 is operating in a specific mode wherein the byte size n is equal to 3. One byte, comprising data bits X2, X1, and X0 and a parity bit XP (XO is the most significant bit) is input into terminals A1–AP, respectively. Another 3-bit byte plus parity comprising data bits Y2, Y1, and Y0 and a parity bit YP are input into B1–BP, respectively. Since this is a 3-bit byte configuration, P1 is set to zero, and P2 is set to VEE (binary 1). The carry look-ahead designation appearing in FIG. 4 refers to a carry look-ahead circuit which may be substantially the same as that shown and described in Related Invention No. 1. If device 20 is operating on the first byte of data, the CIN and CIND inputs into device 20 should by tied together unless it is desired to provide an alternate duplicate carry-in CIN'.

When operating in the Boolean logic mode, the internal carries are disabled by placing mode control signal M16 in the 0 state. All 16 logic functions of the two variables Ai and Bi are then available by permutating M1–M8.

When operating in the arithmetic mode, the internal carries must be enabled by placing M16 in the 1 state. Subtraction is accomplished by internally taking the 1's complement of the Bi operand and performing addition which results in $Fi = Ai - Bi + CIN - 1$. In order to obtain the desired result $Fi = Ai - Bi$, CIN must be set initially to a 1 which in effect produces the 2's complement of Bi.

The invert parity input IP is provided to force inverted information on the FP output for testing downstream parity checking circuits. Odd parity is normally provided on the FP output terminal.

When operating in the arithmetic mode, the duplicate carryin input CIND is driven by the carry-out output COUT of the prior byte and is compared with the carry-in input CIN from the associated carry look-ahead circuit to detect carry burst errors. When operating in the Boolean mode, this check is disabled.

The parity check input PCK serves to enable the half-sum parity check and is normally in the true state, unless the input data does not contain parity bits and only parity prediction is desired.

It will be apparent to those skilled in the art that the disclosed improved current mode 4-bit arithmetic logic unit with parity may be modified in numerous ways and may assume many embodiments other than that specifically set out and described above.

Accordingly, it is intended by the appended claims to cover all modifications of the invention which fall within the true spirit and scope of the invention.

What is claimed is:

1. A current mode 4-bit arithmetic logic unit for performing a repertoire of binary arithmetic and logic operations on two n-bit plus parity input bytes Ai and Bi, where $0 < n \leq 4$, said arithmetic logic unit further performing parity prediction, parity checking, and carry checking operations, said arithmetic logic unit comprising:

a first portion for receiving said first and second n-bit bytes A$i$ and B$i$, a carry-in signal CIN, a mode control signal, and generating a binary output resultant signal F$i$ in response to said mode control signal; and a second portion receiving said carry-in signal CIN, a carry-in duplicate signal CIND, and the parity bits AP and BP associated with said first and second n-bit bytes, said second portion further receiving as inputs thereto a carry error signal $\overline{CE}$, a parity of the half-sums signal HS, a parity of the half parities signal HP, an invert parity signal IP, a parity check signal PCK, a pair of configuration select signals P1 and P2, and a parity of the carries signal PC from an external source, said second portion generating a parity prediction signal FP and error signal E in accordance with the following logic equations:

Parity (FP) and Error (E) Outputs:

FP = }CIN·[$\overline{HS1·K2}$) + (HS2·K4·($\overline{HS4·K8}$))]·M16}

$\oplus$ {G1·K2·[($\overline{HS2·K4}$) + (HS4·k8)]·M16}

$\oplus$ {G2·K4·(HS4·K8)·M16}

$\oplus$ {G4·K8·M16}

$\oplus$ {IP}

$\oplus$ {PC}

$\oplus$ {$\overline{HS \oplus HS1 \oplus (HS2·K2) \oplus (HS4·K4) \oplus (HS8·K8)}$}

E = {(CIN $\oplus$ CIN)·M16} + {CE} + }[AP $\oplus$ BP}

$\oplus$ [$\overline{HS \oplus HS1 \oplus (HS2·K2) \oplus (HS4·K4) \oplus (HS8·K8)}$]

$\oplus$ [HP $\oplus$ HP1 $\oplus$ (HP2·K2) $\oplus$ (HP4·K4) $\oplus$ (HP8·K8)]·PCK

K2 = P2 + P1

K4 = P2

K8 = P2·P1

Half Sum, Half Parity, Propagates, and Generates Intermediate Signals (HS$i$, HP$i$, P$i$, PP$i$, G$i$, GP$i$):

| Half Sum, Half Parity, Propagates, and Generates Intermediates Signals (HSi, HPi, Pi, PPi, Gi, GPi): | | | | | |
|---|---|---|---|---|---|
| For i = 1,2,4,8 | | | | | |
| Gi = M8·Ai·Bi + N4·Ai·$\overline{Bi}$ | | | GPi = M8·Bi·Ai + M1·Bi·$\overline{Ai}$ | | |
| Pi = Ai + M2·$\overline{Bi}$ + M1·Bi | | | PPi = Bi + M2·$\overline{Ai}$ + M4·Ai | | |
| HSi = $\overline{Gi}$·Pi | | | HPi = $\overline{GPi}$·PPi | | |
| M8 | M4 | M2 | M1 | HSi | HPi |
| 0 | 0 | 0 | 0 | Ai | Bi |
| 0 | 0 | 0 | 1 | Ai + $\overline{Bi}$ | Ai·Bi |
| 0 | 0 | 1 | 0 | Ai + $\overline{Bi}$ | $\overline{Ai}$ + Bi |

-continued

Half Sum, Half Parity, Propagates, and Generates Intermediates Signals (HSi, HPi, Pi, PPi, Gi, GPi):

For i = 1,2,4,8
Gi = M8·Ai·Bi + N4·Ai·$\overline{Bi}$          GPi = M8·Bi·Ai + M1·Bi·$\overline{Ai}$
Pi = Ai + M2·$\overline{Bi}$ + M1·Bi          PPi = Bi + M2·$\overline{Ai}$ + M4·Ai
HSi = $\overline{Gi}$·Pi                       HPi = $\overline{GPi}$·PPi

| | | | | | |
|---|---|---|---|---|---|
| 0 | 0 | 1 | 1 | 1 | Ai $\overline{\oplus}$ Bi |
| 0 | 1 | 0 | 0 | Ai·Bi | Ai + Bi |
| 0 | 1 | 0 | 1 | Bi | Ai |
| 0 | 1 | 1 | 0 | Ai $\oplus$ Bi | 1 |
| 0 | 1 | 1 | 1 | $\overline{Ai}$ + Bi | Ai + $\overline{Bi}$ |
| 1 | 0 | 0 | 0 | Ai·$\overline{Bi}$ | $\overline{Ai}$·Bi |
| 1 | 0 | 0 | 1 | Ai $\oplus$ Bi | 0 |
| 1 | 0 | 1 | 0 | $\overline{Bi}$ | $\overline{Ai}$ |
| 1 | 0 | 1 | 1 | $\overline{Ai}$ + $\overline{Bi}$ | $\overline{Ai}$·$\overline{Bi}$ |
| 1 | 1 | 0 | 0 | 0 | Ai $\overline{\oplus}$ Bi |
| 1 | 1 | 0 | 1 | $\overline{Ai}$·Bi | Ai·$\overline{Bi}$ |
| 1 | 1 | 1 | 0 | $\overline{Ai}$·$\overline{Bi}$ | $\overline{Ai}$ + $\overline{Bi}$ |
| 1 | 1 | 1 | 1 | $\overline{Ai}$ | $\overline{Bi}$ |

Carry Intermediate Signals (Ci):

-continued

Half Sum, Half Parity, Propagates, and Generates Intermediates Signals (HSi, HPi, Pi, PPi, Gi, GPi):

For i = 1,2,4,8
Gi = M8·Ai·Bi + N4·Ai·$\overline{Bi}$          GPi = M8·Bi·Ai + M1·Bi·$\overline{Ai}$
Pi = Ai + M2·$\overline{Bi}$ + M1·Bi          PPi = Bi + M2·$\overline{Ai}$ + M4·Ai
HSi = $\overline{Gi}$·Pi                       HPi = $\overline{GPi}$·PPi C1 = CIN
C2 = G1 + HS1·CIN
C4 = G2 + HS2·G1 + HS2·HS1·CIN
C8 = G4 + HS4·G2 + HS4·HS2·G1 + HS4·HS2·HS1·CIN

| P2 | P1 | K8 | K4 | K2 | # of Active Bits n in ALU |
|---|---|---|---|---|---|
| 0 | 0 | 0 | 0 | 0 | 1 |
| 0 | 1 | 0 | 0 | 1 | 2 |
| 1 | 0 | 0 | 1 | 1 | 3 |
| 1 | 1 | 1 | 1 | 1 | 4 |

2. The current mode 4-bit arithmetic logic unit recited in claim 1 and further comprising:
configuration means within said second portion, said configuration means being responsive to said configuration select signals, said configuration means configuring said arithmetic logic unit to operate upon input bytes of 1 to 4 data bits in response to said configuration select signals.

* * * * *